May 28, 1968   H. EHRENS ET AL   3,385,321
MULTIPORT VALVE
Filed Aug. 26, 1965
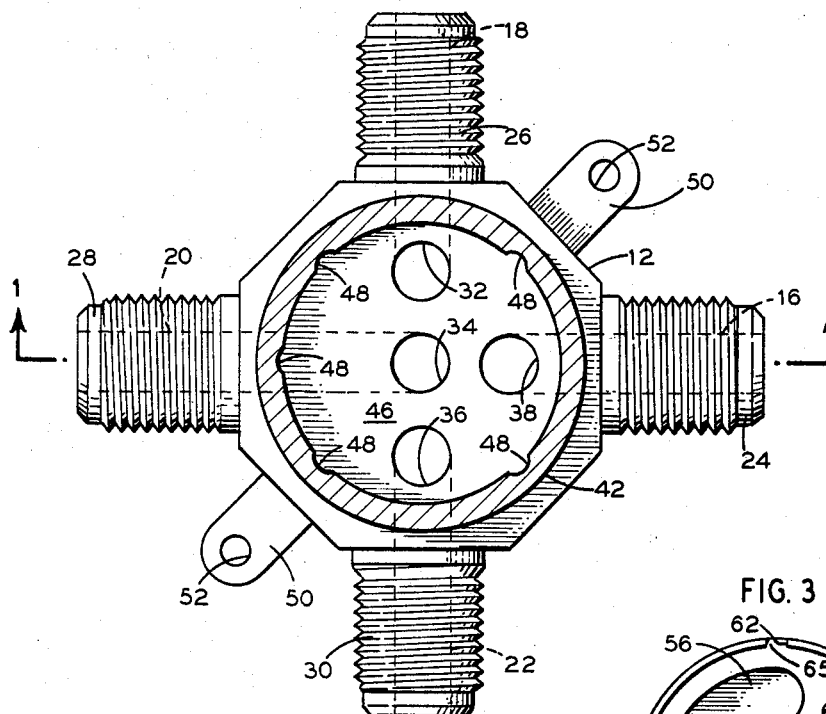
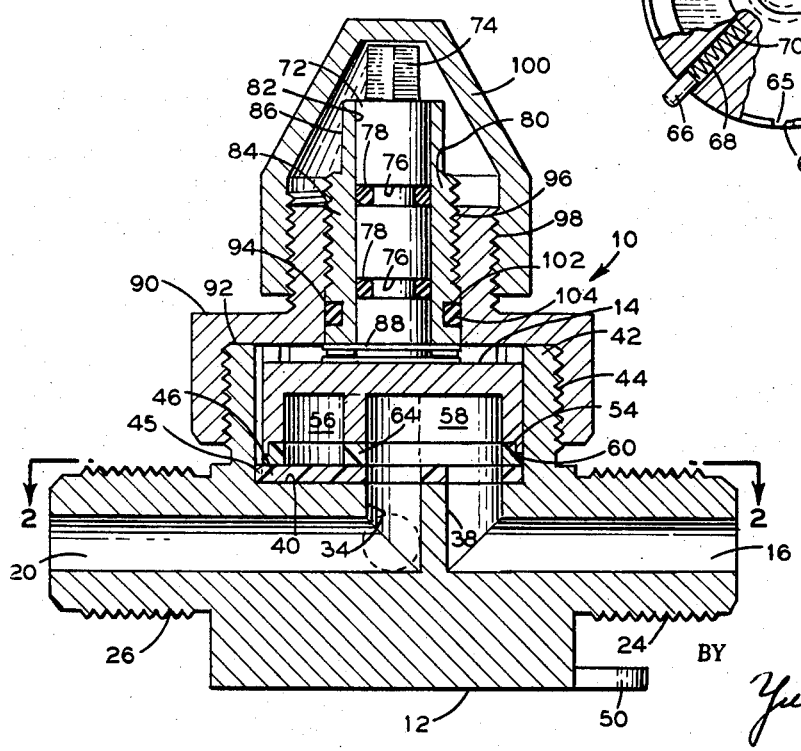
INVENTORS
Henry Ehrens
Sidney Weiner
BY *Yuter & Spiecens*
ATTORNEYS United States Patent Office 3,385,321
Patented May 28, 1968

3,385,321
MULTIPORT VALVE
Henry Ehrens, Riverdale, N.Y., and Sidney Wiener, Cresskill, N.J., assignors to Sealed United Parts Co., Inc., New York, N.Y., a corporation of New York
Filed Aug. 26, 1965, Ser. No. 482,763
1 Claim (Cl. 137—625.46)

ABSTRACT OF THE DISCLOSURE

A multiport valve having a stationary member provided with a plurality of ports and a rotatable member having passages adapted to connect together different ports in response to the movement of the rotatable member. Gaskets having apertures in registry with the respective ports and passages are provided for the stationary and rotatable members and are positioned to abut each other. An intermediate member is provided to selectively apply an axial force to the valve to compress the gaskets and prevent cross-flow between the ports or to reduce the axial force to permit movement of the rotatable member without causing undue wear of the gaskets.

---

This invention relates generally to a multiport valve of the type including a stationary member in engagement with a rotatable member adapted to connect together selected ones of the ports and more particularly, pertains to a valve having a novel structural arrangement that provides for the reduction of the force between the members when the rotatable member is operated.

Multiport valves normally comprise a stationary valve member having a plurality of ports that are connected to devices through which a fluid selectively flows and a rotatable valve member that connects selected ones of the ports to control the flow of the fluid through the ports. A resilient interface is provided between the members and a clamping arrangement or a similar device forces the two members together to compress the resilient member and thereby prevent cross-flow between the ports. However, the operation of the rotatable member in the presence of this axial force causes undue erosion of the face of the resilient member which eventually results in cross-flow between the ports and the loss of the fluid to the atmosphere. Moreover, if dust or a similar foreign particle gets between the resilient interfaces, the particle will be forced into the resilient members and will eventually wear a groove between the ports to likewise cause cross-flow of the fluid.

Accordingly, a desideratum of the present invention is to provide a multiport valve having a stationary and a movable valve member in forced engagement, wherein the forces between the valve members may be substantially reduced during the operation of the movable member.

Another object of the present invention is to provide a multiport valve of the type described that prevents flow of a liquid to the atmosphere during operation of the rotatable member.

A further object of the present invention is to provide a multiport valve which is simple to assemble and easy to maintain.

A preferred embodiment of the present invention comprises a valve casing including a lower valve member having a recessed valve face provided with a plurality of ports and an upper valve member rotatably mounted on the lower valve member having an upper valve face provided with passage means therein adapted to connect together different preselected ones of the ports upon rotation of the upper valve member to different positions. A first and a second gasket overlie the respective valve faces of the upper and lower members in flush engagement therewith and are provided with passages therethrough which register with the respective ports and passages in the respective valve members. The first and second gaskets are in flush face-to-face contact with each other and an intermediate member is slidably received on the upper rotatable valve member. A collar threadedly engages the lower valve member and the intermediate member whereby the intermediate member is axially movable with respect to the upper valve member upon rotation with respect thereto. A plurality of O-rings provide an air-tight seal between the upper member and the intermediate member. Thus, the upper member may be rotated to a desired position whereupon the intermediate member may be rotated in one direction relative to the collar to exert an axial force on the upper member to compress the gaskets and thereby prevent cross-flow between the ports. However, when it is desired to change the position of the upper member to connect together other ports of the valve, the intermediate member may be rotated in the opposite direction to reduce the force between the upper and lower valve members and thereby allow rotation of the upper member.

A feature of the present invention is to provide a multiport valve of the rotary member type, having gaskets between the valve members wherein an intermediate member is adapted to force the valve members together when the rotary member is in a desired position and the intermediate member is further adapted to reduce the force exerted on the valve members when the rotatable member is operated to a new position. Since the force between the valve members is substantially reduced during the rotation of the rotary member, the wear on the gaskets is substantially less than the wear occurring in the prior art type of multiport valves described above. Moreover, a greater force may be exerted on the valve members of the present device than on the valve members of multiport valves heretofore produced so that the present arrangement may be used in conjunction with fluids under greater pressures.

Other objects and advantages of the present invention will become more apparent from a consideration of the following detailed description when taken in conjunction with the accompanying drawings, in which:

FIG. 1 is an elevational sectional view of a multiport valve constructed according to the present invention, the view being taken generally along the line 1—1 in FIG. 2;

FIG. 2 is a cross-sectional view taken generally along the line 2—2 in FIG. 1; and FIG. 3 is an enlarged bottom plan view, with parts broken away, of the rotatable upper valve member illustrated in FIG. 1.

The drawings are substantially to scale of a working model of the present invention. Like numbers in the various figures indicate identical elements.

As shown in FIGS 1 and 2, the multiport valve of the present invention comprises a valve casing designated generally by the numeral 10 and includes a lower valve member 12 and a circular upper valve member 14 which is rotatable with respect to the lower member. The lower member 12 is provided with four longitudinally extending passages respectively denoted by the numerals 16, 18, 20 and 22. The passages 16 and 20 are coaxial and extend in opposite directions through the respective threaded connecting members 24 and 26. Similarly, the passages 18 and 22 are coaxial and extend in opposite directions through the respective threaded connecting members 28 and 30. As shown in FIG. 2, the axes of the passages 18, 22 is perpendicular to the axes of the passages 16, 20. The respective outwardly extending connecting members 24, 26, 28 and 30 are adapted to be threadedly engaged by appropriate fittings (not shown) in an air-tight fit to connect the valve 10 to the devices through which the fluid is adapted to flow.

The lower valve member 12 additionally includes a recessed circular valve face 40 which is surrounded by an integral upstanding wall 42. Provided in the valve face 40 are vertically extending spaced ports 32, 34, 36 and 38 which respectively communicate with the passages 18, 20, 22 and 16. In practice, the axes of the ports 32, 34 and 36 are perpendicular to the axes of the passages 18 and 22 and the axes of the ports 34 and 38 are perpendicular to the axes of the passages 16 and 20. A plurality of vertically extending indexing grooves 48 are spaced about the inner surface of the wall 42. Additionally, the wall 42 is provided with an external threaded portion 44. A gasket 46, having apertures therein registering with the ports in the valve face 40 is received in flush engagement with the lower valve face. The gasket 46 is provided with radially extending lugs 45 which are spaced about the periphery of the gasket 46 in registry with the grooves 48 and are received therein so that the gasket 46 is non-rotatably mounted on the lower valve member 12. Ideally, the gasket 46 is fabricated from a low friction type of plastic such as Teflon. Oppositely extending integral bracket arms 50 project from the member 12 and are provided with apertures 52 therein which are adapted to receive bolts therethrough to rigidly mount the valve 10 in a desired position.

The upper valve member 14 is rotatably received within the enlarged bore defined by the peripheral wall 42. The member 14 is provided with an upper valve face 54 which is recessed from the bottom edges thereof and is provided with an arcuate passage or port 56 which extends over a portion of the valve face and an elongated passage 58 which extends radially from the center of the circular upper valve member 14 to a point adjacent the right-hand edge thereof, as taken in FIG. 3. The center of the radius of curvature of the passage 56 coincides with the axis of rotation of the member 14. A peripheral wall 60 surrounds the recessed valve face 54 and is provided with four angularly spaced open-ended slots 62. Provided in flush engagement with the upper valve face 54 is a gasket 64 having passages therethrough registering with the respective passages 56 and 58. The peripheral edge of the gasket 64 is provided with circumferentially spaced lugs 65 which are adapted to be received in the grooves 62 so that the gasket 64 will be non-rotatably received on the valve member 14. The gasket 64 extends beyond the bottom edge of the wall 60 so that the gaskets 64 and 46 will normally be in face-to-face contact with one another. Ideally, the gasket 64 may be fabricated from the same type of low-friction plastic that the gasket 46 is manufactured from.

An integral coaxial shaft 72 extends upwardly from the top surface of the circular member 14 and terminates in a square head portion 74. An intermediate member 80, having a central threaded portion 84, is provided with a through bore 82 which slideably receives the shaft 72 therein. Provided on the shaft 72 are a pair of vertically spaced grooves 76 which respectively receive a different O-ring 78 therein. The O-rings 78 provide an air-tight fit between the shaft 72 and the intermediate member 80. The top portion of the member 80 is provided with opposed recessed flat surfaces 86 which are adapted to be gripped by a wrench or similar tool to rotate the member 80. A thrust bearing 88 is mounted on the shaft 72 between the top surface of the upper valve member 14 and the bottom edge of the intermediate member 80.

Provided on the member 12 is a collar 90 having an enlarged lower bore 92 and a communicating upper bore 94. The bore 92 is internally threaded to threadedly engage the threaded portion 44 of the lower valve member 12. The upper interior portion 96 of the bore 94 is threaded to provide a threaded engagement between the collar 90 and the centrally threaded portion 84 of the intermediate member 80. An external groove 102 is received in the member 80 adjacent the lower edge thereof and receives an O-ring 104 therein to provide an air-tight seal between the collar 90 and the intermediate member 80. The external surface of the upper portion of the collar 90 is threaded at 98 to receive a cap 100 in threaded engagement therewith to cover the exposed surfaces of the intermediate member 80 and the shaft 72.

To define the various positions of the rotatable upper valve member 14, a movable member 66 is provided in the form of a ball disposed in a generally diametrical recess 68 formed in the valve member 14. A spring 70 is disposed between the ball 66 and the closed end of the recess 68 to bias the ball outwardly into one of the indexing grooves 48. The grooves 48 are angularly spaced and the passages 56 and 58 are sized and positioned so that when the ball 66 is received in one of the grooves 48, the passage 58 will connect the ports 32 and 34. Rotation of the member 14 until the indexing mechanism, including the ball 66, engages the next groove 48, causes the passage 58 to connect the ports 38 and 34. Further rotation of the upper valve member 48 until the ball 66 engages the next groove 48 causes the passage 58 to connect the ports 34 and 36 and the passage 56 to connect the ports 38 and 32. Rotation of the upper valve member 14 until the ball 66 engages the next groove 48 causes the passage to connect the ports 38 and 36. The rotation of the member 14 to the next indexed position orients the member 14 so that none of the ports will be connected.

In operation, the cap 100 is removed and the top portion 74 of the shaft 72 is grasped with a wrench or a similar tool to rotate the upper valve member to a desired position until the ball 66 engages the preselected groove 48 to provide positive indexing of the valve member 14. Accordingly, the desired ports will be connected together. The flats 86 of the intermediate member 80 are then grasped by a wrench and the intermediate member 80 is rotated relative to the collar 90 to thereby axially move the member 80 downward relative to the collar 90 and the upper valve member 14 through the thrust bearing 88. Accordingly, the gaskets 64 and 46 will be compressed to prevent cross-flow between the ports and to prevent any fluid flowing through the valve 10 to exit to the atmosphere. When it is desired to reorient the upper valve member 14 to connect different ones of the ports together, the flat surfaces 86 are again grasped by the wrench and the member 80 is rotated in the opposite direction relative to the internally threaded bore 94 of the collar 90 to axially move the member 80 upwardly, thereby decreasing the downward force on the rotatable valve member 14. The head 74 of the shaft 72 may then be grasped by an appropriate tool and the valve member 14 rotated to the desired position in accordance with the above-noted procedure. Accordingly, the member 80 may then be screwed down to again exert a force on the member 14 whereupon the cap 100 may be replaced in threaded engagement with the threaded portion 98 on the collar 90. While it is to be noted that there may be some cross-flow between the ports during the rotation of the valve member 14, it is to be noted that the respective O-rings 78 and 102 provide air-tight seals which prevent the fluid from exiting to the atmosphere during the rotation of the valve member 14.

Accordingly, a multiport valve has been provided which includes a lower valve member and a rotatable upper valve member which are adapted to compress gaskets therebetween to prevent cross-flow of the fluid between the ports. Moreover, means are provided for substantially decreasing the force between the members during operation of the rotatable member to prevent excess wear on the gaskets. Additionally, since the force on the rotatable valve member 14 is selectively reduced during rotation of the valve member, the force exerted on the valve member when the member 14 is in a desired position may be made greater than corresponding forces applied to valves now in use.

While a preferred embodiment of the invention has been shown and described herein, numerous omissions, changes and additions may be made in such embodiment without departing from the spirit and scope of the present invention.

What is claimed is:

1. In a multiport valve, a valve casing including a lower valve member having a recessed circular lower valve face provided with a plurality of ports and an upper valve member rotatably received in said recess having a circular upper valve face provided with passage means adapted to connect together different preselected ones of said plurality of ports upon rotation of said upper valve member to different predetermined positions, a first gasket overlying said lower valve face in flush engagement therewith and having apertures therethrough registering with the ports in said lower valve face, a second gasket overlying the upper valve face and having passages therethrough registering with the passages in said upper valve face, said first and second gaskets being in face-to-face contact with each other, an integral upstanding shaft on the upper surface of said upper valve member, an intermediate member having an externally threaded central portion and a through bore slidably and rotatably receiving said shaft therein bearing upon the upper surface of said upper valve member to exert an axial force on said upper valve member, a collar having an enlarged internally threaded lower bore and a smaller coaxial internally threaded upper bore, said lower bore threadedly engaging the upper portion of said lower valve member to mount the collar on said lower valve member, said upper bore threadedly engaging the threaded central portion of said intermediate member to provide for the axial movement of said intermediate member upon rotation of said intermediate member relative to said collar, whereby said intermediate member may be rotated in one direction relative to the collar to increase the axial force on said upper valve member and compress said first and second gaskets to provent cross-flow between the ports and in the other direction to decrease the axial force on said upper valve member to permit rotation of the upper valve member, and a thrust bearing between the lower surface of said intermediate member and the upper surface of said upper valve member, said shaft being provided.

References Cited

UNITED STATES PATENTS

| 661,712 | 11/1900 | Cederstrom | 251—164 X |
| 681,183 | 8/1901 | Bessey et al. | 251—297 |
| 903,175 | 11/1908 | Collins | 137—382 |
| 2,521,490 | 9/1950 | Strauss | 251—297 X |
| 2,974,681 | 3/1961 | Whitehurst | 251—368 X |
| 3,026,899 | 3/1962 | Mishanski | 251—368 X |
| 3,126,132 | 3/1964 | Lyon et al. | 137—625.46 X |
| 3,175,573 | 3/1965 | Vater | 137—382 X |

M. CARY NELSON, *Primary Examiner.*

ARNOLD ROSENTHAL, *Examiner.*

UNITED STATES PATENT OFFICE
CERTIFICATE OF CORRECTION

Patent No. 3,385,321                            May 28, 1968

Henry Ehrens et al.

It is certified that error appears in the above identified patent and that said Letters Patent are hereby corrected as shown below:

In the heading to the printed specification, lines 3, 4 and 5, "Sidney Wiener, Cresskill, N. J., assignors to Sealed United Parts Co., Inc.," should read -- Sidney Weiner, Cresskill, N. J., assignors to Sealed Unit Part Co., Inc., --. Column 6, line 16, after "provided" insert -- with a plurality of vertically spaced grooves, and different O-rings received in each of said plurality of grooves for providing an airtight seal between said shaft and said intermediate member, a groove in said intermediate member adjacent the bottom surface thereof, and an O-ring in said groove for providing an airtight seal between said intermediate member and said collar. --.

Signed and sealed this 30th day of December 1969.

(SEAL)
Attest:

EDWARD M. FLETCHER, JR.                      WILLIAM E. SCHUYLER, JR.
Attesting Officer                            Commissioner of Patents